US012669285B2

(12) United States Patent
Liu et al.

(10) Patent No.: US 12,669,285 B2
(45) Date of Patent: Jun. 30, 2026

(54) AIR OUTLET APPARATUS AND DRYING DEVICE

(71) Applicant: JIANGSU CONTEMPORARY AMPEREX TECHNOLOGY LIMITED, Changzhou (CN)

(72) Inventors: Mingli Liu, Changzhou (CN); Xuyong Liu, Changzhou (CN); Chonghao Pan, Changzhou (CN); Zhonglei Yu, Changzhou (CN); Hongwu Shang, Changzhou (CN); Shisong Li, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 569 days.

(21) Appl. No.: 18/327,047

(22) Filed: May 31, 2023

(65) Prior Publication Data

US 2023/0304736 A1 Sep. 28, 2023

Related U.S. Application Data

(63) Continuation of application No. PCT/CN2022/121536, filed on Sep. 27, 2022.

(30) Foreign Application Priority Data

Oct. 19, 2021 (CN) ......................... 202122511157.9

(51) Int. Cl.
*F26B 21/30* (2026.01)

(52) U.S. Cl.
CPC .................................... *F26B 21/30* (2026.01)

(58) Field of Classification Search
CPC ............................ B05D 3/0413; B05D 3/0406
See application file for complete search history.

(56) References Cited

U.S. PATENT DOCUMENTS 1,994,220 A 3/1935 Hormel
2,780,877 A 2/1957 Warner
(Continued)

FOREIGN PATENT DOCUMENTS

CN 105091555 A 11/2015
CN 109210924 A 1/2019
(Continued)

OTHER PUBLICATIONS

The extended European search report received in the corresponding European Application 22882597.2, mailed on Jul. 17, 2024.
(Continued)

*Primary Examiner* — Jason Lau
(74) *Attorney, Agent, or Firm* — K&L Gates LLP

(57) ABSTRACT

Provided are an air outlet apparatus and a drying device. The air outlet apparatus includes: a housing provided with a first cavity and an air inlet and an air outlet communicated with the first cavity; and a wind speed adjusting assembly, where the first cavity is provided with a plurality of wind speed adjusting assemblies distributed in a first direction, such that the first cavity is divided into a plurality of air outlet sections distributed in the first direction by the wind speed adjusting assembly; and where each of the wind speed adjusting assemblies is configured to open or close at least some air outlets, so as to adjust outlet wind speed of each of the air outlet sections. The drying device includes the above air outlet apparatus.

20 Claims, 4 Drawing Sheets

(56) References Cited

U.S. PATENT DOCUMENTS

| | | | |
|---|---|---|---|
| 3,358,384 | A | 12/1967 | Aktiebolaget |
| 2011/0030820 | A1 | 2/2011 | Langevin |
| 2014/0158234 | A1 | 6/2014 | Langevin et al. |

FOREIGN PATENT DOCUMENTS

| | | | | | |
|---|---|---|---|---|---|
| CN | 209340702 | U | | 9/2019 | |
| CN | 111299103 | A | | 6/2020 | |
| CN | 211660405 | U | | 10/2020 | |
| CN | 213194424 | U | | 5/2021 | |
| CN | 213914674 | U | | 8/2021 | |
| CN | 214132595 | U | | 9/2021 | |
| CN | 216322931 | U | | 4/2022 | |
| DE | 102007055659 | A1 | | 5/2009 | |
| GB | 812429 | A | | 4/1959 | |
| JP | 2001324207 | A | | 11/2001 | |
| JP | 2003202140 | A | | 7/2003 | |
| JP | 3932895 | B2 | | 6/2007 | |
| KR | 20080003346 | U | * | 8/2008 | ........... F04D 29/403 |

OTHER PUBLICATIONS

International Search Report received in the corresponding International Application PCT/CN2022/121536, mailed Dec. 28, 2022.

Written Opinion received in the corresponding International Application PCT/CN2022/121536, mailed Dec. 28, 2022.

* cited by examiner

AIR OUTLET APPARATUS AND DRYING DEVICE

CROSS-REFERENCE

The present application is a continuation of International Application PCT/CN2022/121536, filed Sep. 27, 2022, which claims priority to the Chinese patent application No. 2021225111579 entitled "AIR OUTLET APPARATUS AND DRYING DEVICE" submitted on Oct. 19, 2021, which is fully incorporated by reference into the present application.

TECHNICAL FIELD

The present application relates to the technical field of drying devices, and in particular, to an air outlet apparatus and a drying device.

BACKGROUND

Coating processing is a production process during production of lithium batteries. It is mainly to coat slurry, insulating glue and other materials on a substrate (aluminum foil or copper foil) uniformly, continuously or intermittently, and then dry them. Specifically, drying is performed through a drying device. The hot air generated by the drying device is discharged to a coating area on a surface of the substrate, and then a solvent in a wet coating is dried and removed. Different coating areas on the surface of the substrate (such as slurry coating area, insulating glue coating area) require different drying temperature, time and other conditions, but in some cases, the drying device cannot perform a targeted drying on various coating areas on the surface of the substrate, which may easily lead to drying cracking or drying failure in some coating areas, affecting drying quality of the coating area on the surface of the substrate.

SUMMARY

The present application provides an air outlet apparatus and a drying device, which can solve a problem that the drying device cannot perform a targeted drying on each coating area of a battery electrode sheet.

In a first aspect, the present application provides an air outlet apparatus, including a housing and a wind speed adjusting assembly, where the housing is provided with a first cavity and an air inlet and an air outlet communicated with the first cavity; and the first cavity is provided with a plurality of wind speed adjusting assemblies distributed in a first direction, such that the first cavity is divided into a plurality of air outlet sections distributed in the first direction by the wind speed adjusting assembly; and where each of the wind speed adjusting assemblies is configured to open or close at least some air outlets, so as to adjust outlet wind speed of each of the air outlet sections. In technical solutions of embodiments of the present application, the first cavity is divided into the plurality of air outlet sections distributed in the first direction by the wind speed adjusting assembly, such that each air outlet section can be respectively aligned with different coating areas of the battery electrode sheet, and each wind speed adjusting assembly can open or close at least some air outlets, such that outlet wind speed of each air outlet section increases or decreases, which meets wind speed requirements of different coating areas of the battery electrode sheet. Therefore, each coating area of the battery electrode sheet can be dried under suitable conditions, improving drying quality.

In some embodiments, the wind speed adjusting assembly includes an adjusting member, and the air outlet of each of the air outlet sections includes a first air outlet and a second air outlet, where the cross-sectional area of the first air outlet is different from that of the second air outlet, and the adjusting member is configured to close the first air outlet, open the second air outlet, or close the second air outlet, open the first air outlet. In the technical solutions of the embodiments of the present application, by controlling the adjusting member, each air outlet section can be used to discharge air through the first air outlet or through the second air outlet, which is convenient for operation, and the cross-sectional area of the first air outlet is different from that of the second air outlet, such that the outlet wind speed of the first air outlet is different from the outlet wind speed of the second air outlet.

In some embodiments, the adjusting member includes a windshield, the windshield is connected with the housing, and the windshield can move relative to the housing to close the first air outlet, open the second air outlet, or close the second air outlet, open the first air outlet. In the technical solutions of the embodiments of the present application, by operating the windshield, the air outlet section can close the first air outlet and open the second air outlet, or close the second air outlet and open the first air outlet, thereby changing the wind speed of the air outlet section, with a simple structure and convenient operation.

In some embodiments, in a second direction of the air outlet apparatus, both sides of the housing are provided with the second air outlet, the first air outlet is located between the second air outlets, and the adjusting member includes the two windshields provided opposite to each other in the second direction; and where when the two windshields approach and abut against each other, they can block the first air outlet and open the second air outlet, and when the two windshields are away from each other, they can block the second air outlet and open the first air outlet. In the technical solutions of the embodiments of the present application, the wind speed of the air outlet section can be changed by controlling the two windshields to approach or move away from each other, with a simple structure and convenient operation.

In some embodiments, one of the two windshields of the wind speed adjusting assembly is provided with a magnetic member, and the other is provided with a magnetic matching member, such that the two windshields are magnetically attracted through the magnetic member and the magnetic matching member. In the technical solutions of the embodiments of the present application, the opposite windshields are magnetically attracted by the magnetic member and the magnetic matching member, such that the two opposite windshields are in a reliable abutting state, and then the first air outlet can be tightly blocked.

In some embodiments, the windshield is rotatably connected with the housing, and the wind speed adjusting assembly further includes a driving member, where one end of the driving member is connected with the windshield, and the other end protrudes from the housing, and the driving member can drive the windshield rotate relative to the housing. In the technical solutions of the embodiments of the present application, the windshield is driven to rotate relative to the housing by the driving member, such that the windshield closes the first air outlet and opens the second air outlet, or closes the second air outlet and opens the first air outlet, such that it is easier to adjust the wind speed of the air outlet section.

In some embodiments, the driving member is a rigid rope or a rigid rod. In the technical solutions of the embodiments of the present application, the rigid rope or rigid rod has a certain strength. When it is necessary to restore the windshield, it is enough to push the rigid rope or rigid rod outside the housing into the housing, which is convenient for operation.

In some embodiments, the housing includes an outer casing and an air guiding assembly, the air inlet is provided on the outer casing, the first air outlet is provided on the air guiding assembly, and the outer casing is further provided with a through hole, at least part of the air guiding assembly is located in the through hole, and the through hole has a first side wall and a second side wall provided opposite to each other in the second direction; and where the air guiding assembly has a third side wall and a fourth side wall provided opposite to each other in the second direction, and a gap between the first side wall and the third side wall and a gap between the second side wall and the fourth side wall form the second air outlet. In the technical solutions of the embodiments of the present application, the gap between the side wall of the air guiding assembly and the side wall of the outer casing forms the second air outlet, with a simple structure, and the opposite sides of the housing are provided with the second air outlet, such that the air outlet apparatus can dry the opposite sides of the battery electrode sheet in the coating area, expanding an air outlet range and improving drying efficiency. At the same time, when the two windshields respectively abut against both side walls in the second direction of the housing, the second air outlet can be blocked, which is convenient for operation.

In some embodiments, a side wall of the outer casing is provided with a third air outlet, and the first air outlet is communicated with the third air outlet. In the technical solutions of the embodiments of the present application, the return air after bouncing off the surface of the battery electrode sheet can flow to the first air outlet and the third air outlet in sequence and then to the outside of the outer casing, such that the coating area can be evenly heated.

In some embodiments, the air guiding assembly has a second cavity, the first air outlet is communicated with the second cavity, and the side wall of the second cavity is provided opposite to the side wall of the air inlet, and both side walls are provided with the first air outlet; and where the third air outlet is communicated with the second cavity. In the technical solutions of the embodiments of the present application, the second cavity is configured to accommodate the return air after being bounced off the surface of the battery electrode sheet. Since the volume of the second cavity is smaller than that of the housing, the return air discharged from the second cavity can be promoted, improving air outlet efficiency of the rebounded air.

In some embodiments, in a direction away from the air inlet, the cross-sectional area of the second cavity gradually decreases. In the technical solutions of the embodiments of the present application, in the direction away from the air inlet, the cross-sectional area of the second cavity gradually decreases, such that the third side wall and the fourth side wall are respectively inclined towards an axis direction close to the air inlet, and the first side wall is parallel to the third side wall, and the second side wall is parallel to the fourth side wall, such that the air discharged from the second air outlet is concentrated to the middle part of the housing. Further, heat carried by the air can be concentrated on the coating area of the battery electrode sheet, improving the drying efficiency on the coating area of the battery electrode sheet.

In some embodiments, the sum of the cross-sectional area of the first air outlets is larger than the sum of the cross-sectional area of the second air outlets. In the technical solutions of the embodiments of the present application, the sum of the cross-sectional area of the first air outlets is greater than the sum of the cross-sectional area of the second air outlets, such that when the air outlet section discharges the air through the first air outlet, the outlet wind speed of the air outlet section decreases, and when the air outlet section discharges the air through the second air outlet, the outlet wind speed of the air outlet section increases.

In some embodiments, the wind speed adjusting assembly further includes partition plates provided opposite to each other in the first direction, and the partition plate is configured to separate the adjacent air outlet sections. In the technical solutions of the embodiments of the present application, the partition plate is configured to separate the adjacent air outlet sections, such that the adjacent air outlet sections can output air independently, and the wind speed of the adjacent air outlet sections will not affect each other, which is convenient to keep each coating area of the battery electrode sheet in a suitable drying environment.

In a second aspect, the present application provides a drying device, including the air outlet apparatus in the above embodiments.

The above description is only an overview of the technical solution of the present application. In order to better under the technical means of the present application, it can be implemented in accordance with the content of the description, and in order to make the above and other objectives, features and advantages of the present application more obvious and mobile, the specific embodiments of the present application is given as follows.

BRIEF DESCRIPTION OF DRAWINGS

Various other advantages and benefits will become apparent to those of ordinary skill in the art upon reading the following detailed description of the preferred embodiments. The drawings are only for the purpose of illustrating the preferred embodiments and are not to be considered as limiting the present application. Also throughout the drawings, the same reference numerals are used to designate the same parts. In the drawings.

REFERENCE NUMERALS

Figure 1:
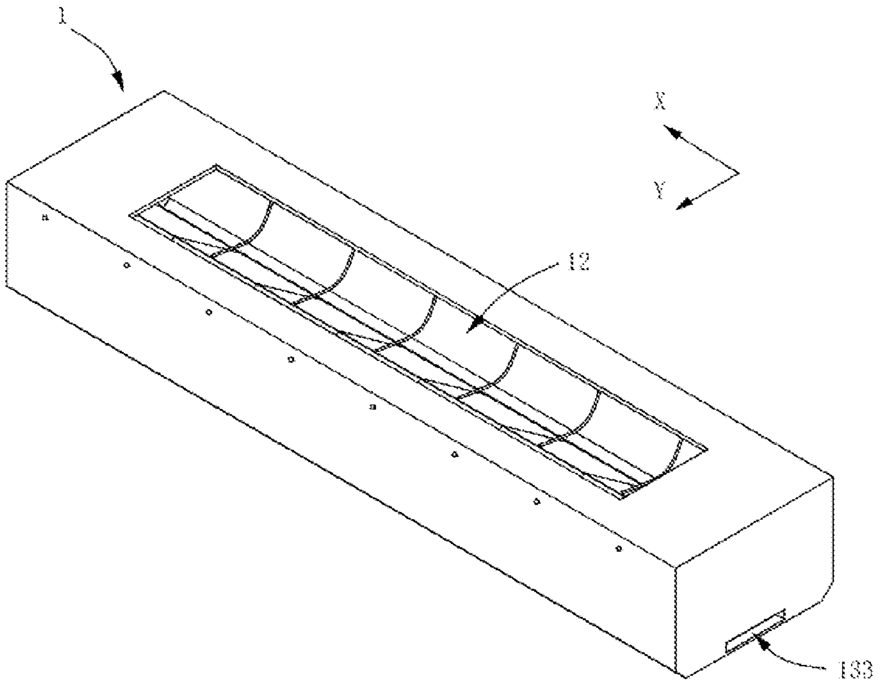
FIG. 1 is a schematic structural diagram of an air outlet apparatus according to some embodiments of the present application.

1—housing; 11—first cavity; 111—air outlet section; 12—air inlet; 13—air outlet; 131—first air outlet; 132—second air outlet; 133—third air outlet; 14—outer casing; 141—through hole; 1411—first side wall; 1412—second side wall; 15—air guiding assembly; 151—third side wall;

152—fourth side wall; 153—second cavity; 2—wind speed adjusting assembly; 21—adjusting member; 211—windshield; 22—driving member; 23—partition plate.

DESCRIPTION OF EMBODIMENTS

To make the above objectives, features, and advantages of the present application obvious and understandable, the specific implementation manners of the present application will be described in detail below in conjunction with the accompanying drawings. In the following description, numerous specific details are set forth in order to provide a thorough understanding of the present application. However, the present application can be implemented in many other ways different from those described here, and those skilled in the art can make similar improvements without departing from the connotation of the present application, so the present application is not limited by the specific embodiments disclosed below.

In the description of the present application, it should be understood that orientations or positional relationships indicated by terms such as "center", "longitudinal", "crosswise", "length", "width", "thickness", "up", "down", "front", "rear", "left", "right", "vertical", "horizontal", "top", "bottom", "inside", "outside", "clockwise", "anticlockwise", "axial direction", "radial direction" and "circumferential direction" are orientations or positional relationships shown based on the drawings, and the terms are merely for convenience of describing the present application and for simplifying the description, but for indicating or implying that an indicated apparatus or element must have a specific orientation, and must be constructed and operated in a specific orientation, which thus may not be understood as limiting the present application.

In addition, the terms "first" and "second" are only intended for a purpose of description, and shall not be understood as an indication or implication of relative importance or implicit indication of the quantity of indicated technical features. Thus, the features defined as "first" and "second" may explicitly or implicitly include at least one of the features. In the description of the present application, "a plurality of" refers to at least two, such as two and three, unless otherwise specifically defined.

In the present application, unless otherwise explicitly specified and defined, the terms "mounting", "connecting", "connection" and "fixing" should be understood in a broad sense, for example, they may be a fixed connection, a detachable connection, or an integrated connection, may also be a mechanical connection, or may be an electrical connection; may be a direct connection and may also be an indirect connection via an intermediate medium, or may be communication between the interiors of two elements or the interaction between two elements, unless otherwise specifically defined. Those of ordinary skill in the art may appreciate the specific meanings of the foregoing terms in the present application according to specific circumstances.

In the present application, unless otherwise clearly specified and limited, a first feature being "on" or "under" a second feature may mean that the first and second features are in direct contact, or that the first and second features are in indirect contact through an intermediate medium. However, the first feature is "over", "above", and "on" the second feature can mean that the first feature is directly or diagonally above the second feature, or simply indicates that the horizontal height of the first feature is higher than that of the second feature. The first feature "underneath", "below", and "under" the second feature can mean that the first feature is directly or diagonally below the second feature, or simply indicates that the horizontal height of the first feature is less than that of the second feature.

In the present application, "a plurality of" means two or more (including two).

In the present application, a basic unit forming a battery is a battery cell, and the battery cell may include a lithium-ion secondary battery, a lithium-ion primary battery, a lithium-sulfur battery, a sodium/lithium-ion battery, a sodium-ion battery or a magnesium-ion battery and the like, which is not limited by the embodiments of the present application. The battery cell may be cylindrical, flat, cuboid or in another shape, which is not limited by the embodiments of the present application. The battery cell is generally divided into three types according to the way of packaging: a cylindrical battery cell, a prismatic battery cell and a pouch battery cell, which is not limited by the embodiments of the present application.

The battery cell includes an electrode assembly and an electrolytic solution, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive electrode active substance layer. The positive electrode active substance layer is coated on a surface of the positive electrode current collector, the positive electrode current collector not coated with the positive electrode active substance layer protrudes from the positive electrode current collector coated with the positive electrode active substance layer, and the positive electrode current collector not coated with the positive electrode active substance layer is used as a positive electrode tab. As an example, in a lithium-ion battery, a material of the positive electrode current collector may be aluminum, and a positive electrode active substance may be lithium cobaltate, lithium iron phosphate, ternary lithium, lithium manganate and the like. The negative electrode sheet includes a negative electrode current collector and a negative active substance layer. The negative active substance layer is coated on a surface of the negative electrode current collector, and the negative current collector not coated with the negative active substance layer protrudes from the negative current collector coated with the negative active substance layer, and the negative electrode current collector not coated with the negative electrode active substance layer is used as a negative electrode tab. A material of the negative electrode current collector may be copper, and a negative electrode active substance may be carbon, silicon and the like. In order to ensure that no fusing occurs when a large current passes, there are a plurality of positive electrode tabs which are stacked together, and there are a plurality of negative electrode tabs which are stacked together. A material of the separator may be polypropylene (polypropylene, PP), polyethylene (polyethylene, PE) and the like. In addition, the electrode assembly may be a winding structure or a laminated structure, and the embodiments of the present application are not limited thereto.

The manufacture of both the positive electrode sheet and the negative electrode sheet requires a coating process. The positive electrode sheet and the negative electrode sheet are collectively referred to as a battery electrode sheet. Coating is the continuous and uniform coating of an active substance layer on a surface of a current collector, followed by drying to remove a solvent in a wet coating. During a drying process, too high or too low drying speed may lead to cracking of electrochemical performance of the battery, such as an increase in internal resistance, deterioration in corresponding magnification characteristics, and other undesirable phenomena. Therefore, drying conditions are particularly important during a manufacturing process of the battery.

The drying temperature, time, and other conditions required for different coating areas on the surface of the current collector (such as slurry coating area, insulating glue coating area) are different. When drying, placing the current collector in a drying environment with the same drying conditions will make some coating areas unable to be dried under matching drying conditions, further resulting in drying cracking or drying failure in the coating areas, affecting drying quality.

During the drying process of the battery electrode sheet, a drying device is used to dry the wet coating, which at least includes a heater and an air outlet apparatus. The hot air generated by the heater is directed to the coating area on the surface of the current collector through the air outlet apparatus, thereby drying and removing the solvent in the wet coating. The drying device disclosed in the embodiments of the present application can be used, but not limited to, in devices and facilities that need to create a dry environment, such as battery production lines, battery performance testing laboratories, and battery failure analysis laboratories. During the process of drying the battery electrode sheet with the drying device, the performance of the air outlet apparatus affects the drying performance.

Figure 2:
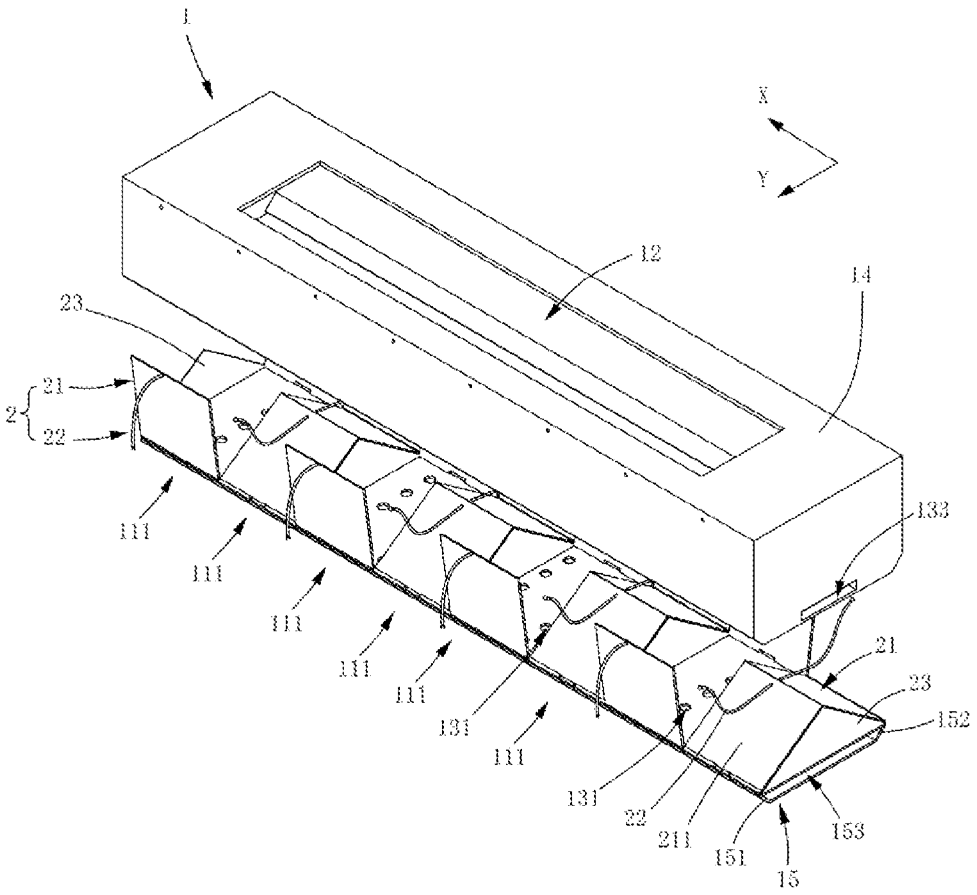
FIG. 2 is an exploded schematic structural diagram of an air outlet apparatus in FIG. 1.
Figure 3:
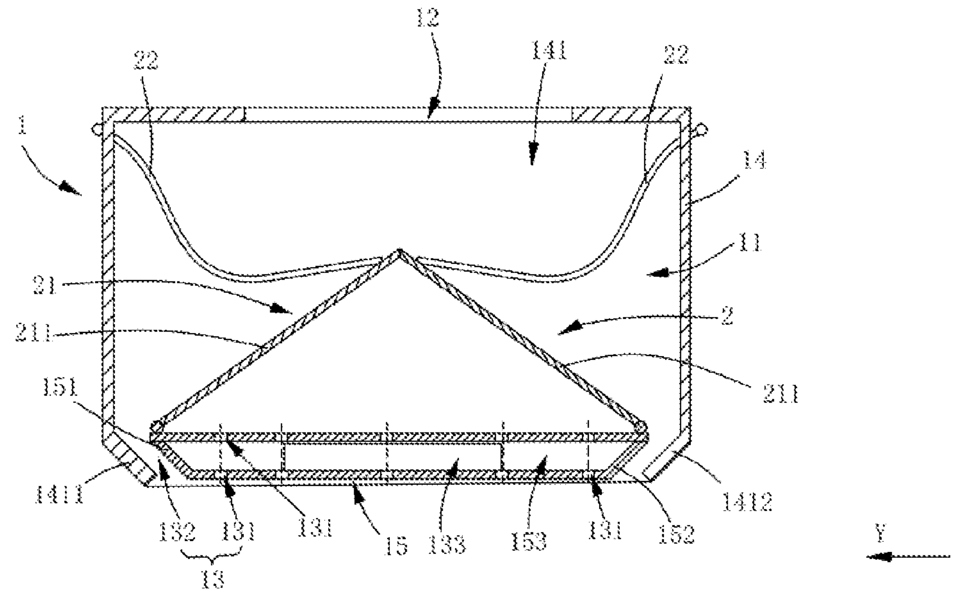
FIG. 3 is a cross-sectional view of an air outlet section of an air outlet apparatus in FIG. 1 in an air outlet state.
Figure 4:
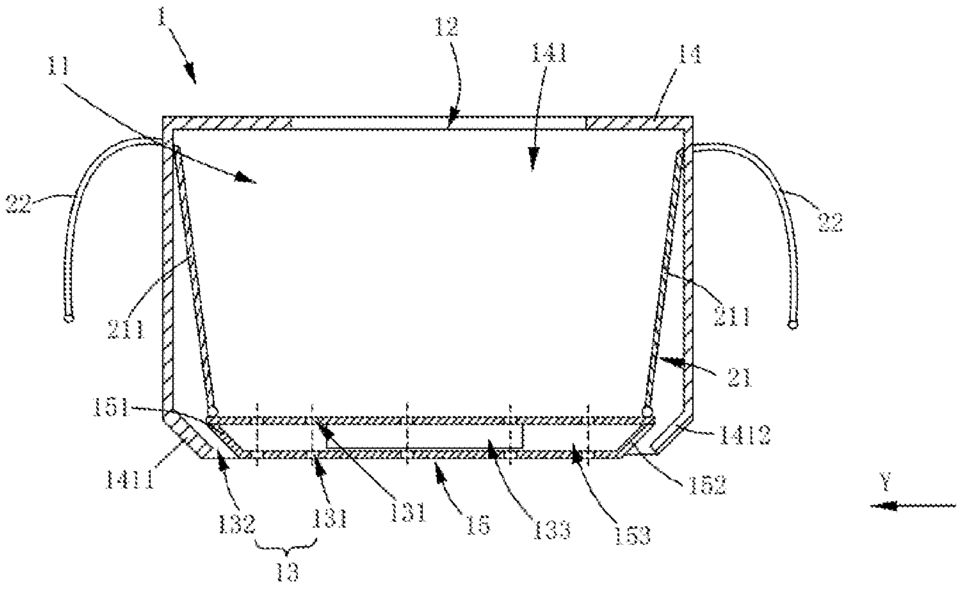
FIG. 4 is a cross-sectional view of an air outlet section of an air outlet apparatus in FIG. 1 in another air outlet state.

As shown in FIG. 1, the present application provides an air outlet apparatus of a drying device. As shown in FIGS. 2-4, the air outlet apparatus includes a housing 1 and a wind speed adjusting assembly 2, where the housing 1 is provided with a first cavity 11 and an air inlet 12 and an air outlet 13 communicated with the first cavity 11; and the first cavity 11 is provided with a plurality of wind speed adjusting assemblies 2 distributed in a first direction X, such that the first cavity is divided into a plurality of air outlet sections 111 distributed in the first direction X by the wind speed adjusting assembly 2; and where each of the wind speed adjusting assemblies 2 is configured to open or close at least some air outlets 13, so as to adjust outlet wind speed of each of the air outlet sections 111.

In the embodiments, the first cavity 11 is divided into the plurality of air outlet sections 111 distributed in the first direction X by the wind speed adjusting assembly 2, each air outlet section 111 can be respectively aligned with different coating areas of the battery electrode sheet, and each wind speed adjusting assembly 2 can open or close at least some air outlets 13, such that outlet wind speed of each air outlet section 111 increases or decreases, which meets wind speed requirements of different coating areas of the battery electrode sheet. Therefore, each coating area of the battery electrode sheet can be dried under suitable conditions, improving drying quality.

Among them, the different coating areas of the battery electrode sheet can be the insulating glue coating area and the slurry coating area. The wind speed required for the insulating glue coating area is relatively slow. On the one hand, it can prevent problems such as drying cracking and insufficient bond strength caused by excessive drying; and on the other hand, it can prevent excessive wind speed from blowing the undried insulating glue to the slurry coating area, resulting in the mixing of the insulating glue and the slurry. However, the correspondingly required wind speed in the slurry coating area is relatively fast, so as to dry an organic solvent in the slurry. Different types of battery electrode sheets are correspondingly provided with different coating positions and different coating materials, so the different coating areas of the battery electrode sheet include but not limited to the insulating glue coating area and the slurry coating area in the embodiments.

Specifically, as shown in FIG. 2, a first direction X in the embodiments refers to a length direction of a housing 1. In other embodiments, the first direction X may also refer to a width direction of the housing 1. Herein, the first direction X is described as an example of the length direction of the housing 1, at this time, a second direction Y is the width direction of the housing 1.

In order to prevent a wind speed adjusting assembly 2 from scratching an object to be dried, in some embodiments of the present application, the wind speed adjusting assembly 2 is provided in a first cavity 11 to reduce the volume of the air outlet apparatus and protect the wind speed adjusting assembly 2 through the first cavity 11.

As shown in FIG. 2, in some embodiments of the present application, a plurality of wind speed adjusting assemblies 2 are provided adjacently in sequence in the first cavity 11 in the first direction X. In other embodiments, the plurality of wind speed adjusting assemblies 2 may also be provided at intervals in the first cavity 11 in the first direction X. The specific arrangement of the wind speed adjusting assembly 2 in the first cavity 11 may be selected according to actual requirements.

As shown in FIGS. 3-4, in some embodiments of the present application, in order to facilitate closing or opening at least some air outlets 13, the wind speed adjusting assembly 2 includes an adjusting member 21, and the air outlet 13 of each of the air outlet sections 111 includes a first air outlet 131 and a second air outlet 132, and where the cross-sectional area of the first air outlet 131 is different from that of the second air outlet 132, and the adjusting member 21 is configured to close the first air outlet 131, open the second air outlet 132, or close the second air outlet 132, open the first air outlet 131.

In the embodiments, by controlling the adjusting member 21, each air outlet section 111 can be used to discharge air through the first air outlet 131 or through the second air outlet 132, which is convenient for operation, and the cross-sectional area of the first air outlet 131 is different from that of the second outlet 132, such that the outlet wind speed of the first air outlet 131 is different from the outlet wind speed of the second air outlet 132. Furthermore, the outlet wind speed of each air outlet section 111 can be increased or decreased.

As shown in FIG. 3, when closing the first air outlet 131 and opening the second air outlet 132, the air outlet section 111 discharges air through the second air outlet 132; and as shown in FIG. 4, when closing the second air outlet 132 and opening the first air outlet 131, the air outlet section 111 discharges air through the first air outlet 131.

At the same time, in some embodiments of the present application, when the adjusting member 21 opens all the second air outlets 132 of each air outlet section 111 and closes all the first air outlets 131, the overall wind speed of the air outlet apparatus is increased for use where quick drying is required; and when the adjusting member 21 opens all the first air outlets 131 of each air outlet section 111 and closes all the second air outlets 132, the overall wind speed of the air outlet apparatus is decreased for use where slow drying is required. The air outlet apparatus in the present application can adjust the overall outlet wind speed to meet requirements of different drying stages of the battery electrode sheet.

In some embodiments of the present application, the sum of the cross-sectional area of the first air outlets 131 is greater than the sum of the cross-sectional area of the second air outlets 132, such that when the air outlet section 111 discharges air through the first air outlet 131, the outlet wind speed of the air outlet section 111 decreases, and when the air outlet section 111 discharges air through the second air outlet 132, the outlet wind speed of the air outlet section 111 increases. In other embodiments, the sum of the cross-sectional area of the second air outlets 132 may also be greater than the sum of the cross-sectional area of the first air outlets 131.

Specifically, as shown in FIGS. 3-4, the adjusting member 21 includes a windshield 211, the windshield 211 is connected with the housing 1, and the windshield 211 can move relative to the housing 1 to close the first air outlet 131, open the second air outlet 132, or close the second air outlet 132, open the first air outlet 131.

In the embodiments, by operating the windshield 211, the first air outlet 131 is closed and the second air outlet 132 is opened, or the second air outlet 132 is closed and the first air outlet 131 is opened, thereby changing the wind speed of the outlet section 111, with a simple structure and convenient operation.

In other embodiments, the adjusting member 21 may also include a windbreak plug, when the windbreak plug is inserted into the first air outlet 131, the first air outlet 131 is in a blocked state, and when the windbreak plug is inserted into the second air outlet 132, the second air outlet 132 is in a blocked state.

Figure 5:
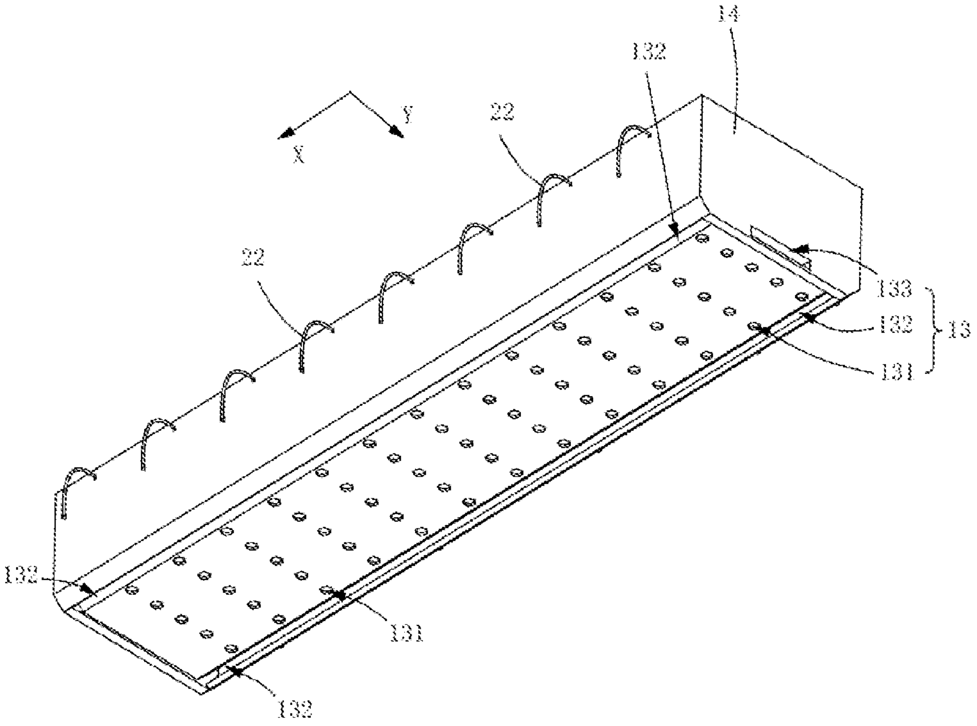
FIG. 5 is a schematic structural diagram of another viewing angle of an air outlet apparatus in FIG. 1.

In some embodiments of the present application, as shown in FIGS. 3-5, in a second direction Y of the air outlet apparatus, both sides of the housing 1 are provided with the second air outlet 132, the first air outlet 131 is located between the second air outlets 132, and the wind speed adjusting assembly 2 includes the two windshields 211 provided opposite to each other in the second direction Y; and where when the two windshields 211 approach and abut against each other, they can block the first air outlet 131 and open the second air outlet 132, and when the two windshields 211 are away from each other, they can block the second air outlet 132 and open the first air outlet 131.

In the embodiments, as shown in FIG. 3, when the two windshields 211 approach and abut against each other, the two windshields 211 together form a barrier to block a passage between the air inlet 12 and the first air outlet 131, such that the air entering from the air inlet 12 cannot flow out from the first air outlet 131, at this time, the air can flow out from the second air outlet 132. As shown in FIG. 4, when the two windshields 211 are away from each other, the passage between the air inlet 12 and the first air outlet 131 is opened, which allows the air to flow out from the first air outlet 131 and blocks the second air outlet 132, with a simple structure and convenient operation.

Specifically, in the embodiments, one of the opposite windshields 211 is provided with a magnetic member, and the other is provided with a magnetic matching member, such that the opposite windshields 211 are magnetically attracted through the magnetic member and the magnetic matching member.

In the embodiments, when the two windshields 211 approach and abut against each other, the opposite windshields 211 are magnetically attracted by the magnetic member and the magnetic matching member, such that the two opposite windshields 211 are in a reliable abutting state, and then the first air outlet 131 can be tightly blocked.

Among them, the magnetic member in the embodiments may be a magnet, and the magnetic matching member may be an iron block. In other embodiments, both the magnetic member and the magnetic matching member may also be magnets.

Further, as shown in FIGS. 2-4, one end of the windshield 211 is rotatably connected with the housing 1, and the wind speed adjusting assembly 2 further includes a driving member 22, where one end of the driving member 22 is connected with the windshield 211, and the driving member 22 can drive the windshield 211 rotate relative to the housing 1.

In the embodiments, the windshield 211 is driven to rotate relative to the housing 1 by the driving member 22, such that the windshield 211 closes the first air outlet 131 and opens the second air outlet 132, or closes the second air outlet 132 and opens the first air outlet 131, such that it is easier to adjust the wind speed of the air outlet section 111.

Specifically, in the embodiments, the driving member 22 is a rigid rope or a rigid rod, one end of the rigid rope or rigid rod is connected with the windshield 211, and the other end extends out of the housing 1, such that the driving member 22 can be pulled from the outside of the housing 1, so as to drive the windshield 211 to rotate relative to the housing 1, and the rigid rope or rigid rod has a certain strength. When it is necessary to restore the windshield 211, it is enough to push the rigid rope or rigid rod outside the housing 1 into the housing 1, which is easy to operate.

Among them, the rigid rope in the embodiments may be a steel wire rope, an iron wire rope, an aluminum alloy rope and the like. The rigid rod in the embodiments may be a steel pipe, an iron pipe, an aluminum alloy pipe and the like.

In some embodiments of the present application, as shown in FIGS. 3-4, the housing 1 includes an outer casing 14 and an air guiding assembly 15, the air inlet 12 is provided on the outer casing 14, the first air outlet 131 is provided on the air guiding assembly 15, and the outer casing 14 is further provided with a through hole 141, the air guiding assembly 15 is mounted in the through hole 141, and the through hole 141 has a first side wall 1411 and a second side wall 1412 provided opposite to each other in the second direction Y; and where the air guiding assembly 15 has a third side wall 151 and a fourth side wall 152 provided opposite to each other in the second direction Y, and a gap between the first side wall 1411 and the third side wall 151 and a gap between the second side wall 1412 and the fourth side wall 152 form the second air outlet.

In the embodiments, the gap between the first side wall 1411 and the third side wall 151 and the gap between the second side wall 1412 and the fourth side wall 152 form the second air outlet 132, with a simple structure, and the opposite sides of the housing 1 are provided with the second air outlet 132, such that the air outlet apparatus can dry opposite sides of the battery electrode sheet in the coating area, expanding an air outlet range and improving drying efficiency. At the same time, when it is necessary to close the second air outlet 132, it is only necessary to block the gap between the first side wall 1411 and the third side wall 151, as well as the gap between the second side wall 1412 and the fourth side wall 152, which is convenient for operation. Specifically, when the two windshields 211 are respectively abutted against the two side walls of the housing 1 in the second direction Y, the second air outlet 132 can be blocked.

Specifically, in the embodiments, the air guiding assembly 15 may be provided with a plurality of circular through holes, and the plurality of circular through holes form a mesh-shaped air outlet, that is, the first air outlet 131 is set as the mesh-shaped air outlet. The size of the gap between the first side wall 1411 of the housing 14 and the third side wall 151 of the air guiding assembly 15 and the size of the gap between the second side wall 1412 of the housing 14 and the fourth side wall 152 of the air guiding assembly 15 are both set to the small size, such that the second air outlet 132 formed by the gap between the first side wall 1411 and the third side wall 151 and the gap between the second side wall 1412 and the fourth side wall 152 is set as a slit-shaped air outlet. Among them, the sum of the cross-sectional area of the mesh-shaped air outlets is greater than the sum of the cross-sectional area of the slit-shaped air outlets. When the adjusting member 21 opens the mesh-shaped air outlet and closes the slit-shaped air outlet, the wind speed of the air outlet section 111 decreases, and when the adjusting member 21 opens the slit-shaped air outlet and closes the mesh-shaped air outlet, the wind speed of the air outlet section 111 increases.

In some embodiments of the present application, as shown in FIG. 2 and FIG. 5, a side wall of the outer casing 14 is provided with a third air outlet 133, and the first air outlet 131 is communicated with the third air outlet 133.

In the embodiments, when the battery electrode sheet is dried by the drying device, the first air outlet 131 faces the battery electrode sheet, and when the adjusting member 21 closes the first air outlet 131, the air discharged from the air inlet 12 cannot be discharged from the first air outlet 131, but can be discharged from the second air outlet 132 and blow to the surface of the battery electrode sheet. After the air bounces off the surface of the battery electrode sheet, it flows to the first air outlet 131 and enters the housing 1, thus avoiding that the air is discharged from the second air outlet 132 to one of the coating areas on the surface of the battery electrode sheet and then diffused to the surrounding coating areas, further resulting in uneven heating of other coating areas. At the same time, when the first air outlet 131 is communicated with the third air outlet 133, the rebounded return air can flow from the third air outlet 133 to the outside of the outer casing 14 after entering the housing 1, thereby further promoting the rebounded return air from the surface of the battery electrode sheet to enter the first air outlet 131, further preventing the air from spreading into other coating areas.

Further, as shown in FIGS. 3-4, the air guiding assembly 15 has a second cavity 153, the first air outlet 131 is communicated with the second cavity 153, and the side wall of the second cavity 153 is provided opposite to the side wall of the air inlet 12, and both side walls are provided with the first air outlet 131; and where the third air outlet 133 is communicated with the second cavity 153.

In the embodiments, when the wind is discharged from the second air outlet 132 and blows to the surface of the battery electrode sheet, the air bounces off the surface of the battery electrode sheet and then flows to the first air outlet 131 and enters the second cavity 153, and the third air outlet 133 is communicated with the second cavity 153, such that the rebounded air flows from the second cavity 153 to the third air outlet 133 and then to the outside of the outer casing 14. That is, the second cavity 153 is configured to accommodate the return air after being bounced off the surface of the battery electrode sheet. Since the volume of the second cavity 153 is smaller than that of the housing 1, the return air discharged from the second cavity 153 can be promoted, improving air outlet efficiency of the rebounded wind.

Among them, as shown in FIGS. 3-4, the side wall of the second cavity 153 is provided opposite to the side wall of the air inlet 12, and the axes of the first air outlets 131 on the both side walls coincide, such that the air entering from the air inlet 12 can flows out from the both side walls.

In some embodiments of the present application, as shown in FIGS. 3-4, in a direction away from the air inlet 12, the cross-sectional area of the second cavity 153 gradually decreases.

In the embodiments, in the direction away from the air inlet 12, the cross-sectional area of the second cavity 153 gradually decreases, such that the third side wall 151 and the fourth side wall 152 are respectively inclined towards an axis direction close to the air inlet 12, and the first side wall 1411 is parallel to the third side wall 151, and the second side wall 1412 is parallel to the fourth side wall 152, such that the air discharged from the second air outlet 132 is concentrated to the middle part of the housing 1. Further, heat carried by the air can be concentrated on the coating area of the battery electrode sheet, improving the drying efficiency on the coating area of the battery electrode sheet.

In some embodiments of the present application, as shown in FIG. 2, the wind speed adjusting assembly 2 further includes partition plates 23 provided opposite to each other in the first direction X, and the partition plate 23 is configured to separate the adjacent air outlet sections 111.

In the embodiments, the partition plate 23 is configured to separate the adjacent air outlet sections 111, such that the adjacent air outlet sections 111 can output air independently, and the wind speed of adjacent air outlet sections 111 will not affect each other, which is convenient to keep each coating area of the battery electrode sheet in a suitable drying environment.

Specifically, when the two opposite windshields 211 approach and abut against each other, the two windshields 211 also abut against the two partition plates 23 provided opposite to each other, respectively. At this time, the windshield 211 and the partition plate 23 surround the air outlet 13 of one air outlet section 111 and are separated from the air outlets 13 of the other air outlet sections 111.

To sum up, when the drying device in the embodiments of the present application dries the battery electrode sheet, the heater can heat the air, and the hot air flows in from the air inlet 12 of the air outlet apparatus, and then is discharged from the air outlet 13 of the air outlet apparatus to the battery electrode sheet. Since the air outlet apparatus is divided into the plurality of air outlet sections 111 in the first direction X by the plurality of wind speed adjusting assemblies 2, each of the wind speed adjusting assemblies can open or close at least some air outlets 13, thereby increasing or decreasing the wind speed of each air outlet section 111, meeting the wind speed requirements for different coating areas of the battery electrode sheet, such that each coating area of the battery electrode sheet can be dried under suitable conditions, improving the drying quality.

The various technical features of the above embodiments can be combined arbitrarily. For the ease of concise description, all possible combinations of the various technical features in the above embodiments are not described. However, as long as there is no contradiction in the combination of the technical features, should be considered as within the scope of the specification.

The above embodiments only express several implementation manners of the present application, and the description thereof is relatively specific and detailed, but should not be construed as limiting the scope of the patent application. It should be noted that those skilled in the art can make several modifications and improvements without departing from the concept of the present application, which all belong to the protection scope of the present application.

What is claimed is:

1. An air outlet apparatus, comprising:

a housing provided with a first cavity and an air inlet and an air outlet communicated with the first cavity; and a wind speed adjusting assembly, wherein the first cavity is provided with a plurality of wind speed adjusting assemblies distributed in a first direction, such that the first cavity is divided into a plurality of air outlet sections distributed in the first direction by the wind speed adjusting assembly; wherein each of the wind speed adjusting assemblies is configured to open or close at least some air outlets, so as to adjust outlet wind speed of each of the air outlet sections, the wind speed adjusting assembly comprises an adjusting member, and the air outlet of each of the air outlet sections comprises a first air outlet and a second air outlet, wherein a cross-sectional area of the first air outlet is different from a cross-sectional area of the second air outlet, and the adjusting member is configured to close the first air outlet, open the second air outlet, or close the second air outlet, open the first air outlet, the adjusting member comprises a windshield, the windshield is connected with the housing, and the windshield can move relative to the housing to close the first air outlet, open the second air outlet, or close the second air outlet, open the first air outlet, in a second direction of the air outlet apparatus, both sides of the housing are provided with the second air outlet, the first air outlet is located between the second air outlets, and the adjusting member comprises the two windshields provided opposite to each other in the second direction, when the two windshields approach and abut against each other, the two windshields block the first air outlet and open the second air outlet, and when the two windshields are away from each other, the two windshields block the second air outlet and open the first air outlet.

2. The air outlet apparatus according to claim 1, wherein one of the two windshields of the wind speed adjusting assembly is provided with a magnetic member, and the other is provided with a magnetic matching member, such that the two windshields are magnetically attracted through the magnetic member and the magnetic matching member.

3. The air outlet apparatus according to claim 1, wherein the windshield is rotatably connected with the housing, and the wind speed adjusting assembly further comprises a driving member, wherein one end of the driving member is connected with the windshield, and the other end protrudes from the housing, and the driving member can drive the windshield rotate relative to the housing.

4. The air outlet apparatus according to claim 3, wherein the driving member is a rigid rope or a rigid rod.

5. The air outlet apparatus according to claim 1, wherein the housing comprises an outer casing and an air guiding assembly, the air inlet is provided on the outer casing, the first air outlet is provided on the air guiding assembly, and the outer casing is further provided with a through hole, at least part of the air guiding assembly is located in the through hole, and the through hole has a first side wall and a second side wall provided opposite to each other in the second direction; and wherein the air guiding assembly has a third side wall and a fourth side wall provided opposite to each other in the second direction, and a gap between the first side wall and the third side wall and a gap between the second side wall and the fourth side wall form the second air outlet.

6. The air outlet apparatus according to claim 5, wherein a side wall of the outer casing is provided with a third air outlet, and the first air outlet is communicated with the third air outlet.

7. The air outlet apparatus according to claim 6, wherein the air guiding assembly has a second cavity, the first air outlet is communicated with the second cavity, and the side wall of the second cavity is provided opposite to the side wall of the air inlet, and both side walls are provided with the first air outlet; and wherein the third air outlet is communicated with the second cavity.

8. The air outlet apparatus according to claim 7, wherein in a direction away from the air inlet, the cross-sectional area of the second cavity gradually decreases.

9. The air outlet apparatus according to claim 1, wherein a sum of the cross-sectional area of the first air outlets is larger than a sum of the cross-sectional area of the second air outlets.

10. The air outlet apparatus according to claim 1, wherein the wind speed adjusting assembly further comprises partition plates provided opposite to each other in the first direction, and the partition plate is configured to separate the adjacent air outlet sections.

11. An air outlet apparatus, comprising:

a housing provided with a first cavity and an air inlet and an air outlet communicated with the first cavity; and a wind speed adjusting assembly, wherein the first cavity is provided with a plurality of wind speed adjusting assemblies distributed in a first direction, such that the first cavity is divided into a plurality of air outlet sections distributed in the first direction by the wind speed adjusting assembly; wherein each of the wind speed adjusting assemblies is configured to open or close at least some air outlets, so as to adjust outlet wind speed of each of the air outlet sections, the wind speed adjusting assembly comprises an adjusting member, and the air outlet of each of the air outlet sections comprises a first air outlet and a second air outlet, wherein a cross-sectional area of the first air outlet is different from a cross-sectional area of the second air outlet, and the adjusting member is configured to close the first air outlet, open the second air outlet, or close the second air outlet, open the first air outlet, the adjusting member comprises a windshield, the windshield is connected with the housing, and the windshield can move relative to the housing to close the first air outlet, open the second air outlet, or close the second air outlet, open the first air outlet, the windshield is rotatably connected with the housing, and the wind speed adjusting assembly further comprises a driving member, wherein one end of the driving member is connected with the windshield, and the other end protrudes from the housing, and the driving member can drive the windshield rotate relative to the housing.

12. The air outlet apparatus according to claim 11, wherein the driving member is a rigid rope or a rigid rod.

13. The air outlet apparatus according to claim 11, wherein a sum of the cross-sectional area of the first air outlets is larger than a sum of the cross-sectional area of the second air outlets.

14. The air outlet apparatus according to claim 11, wherein the wind speed adjusting assembly further comprises partition plates provided opposite to each other in the first direction, and the partition plate is configured to separate the adjacent air outlet sections.

15. An air outlet apparatus, comprising:

a housing provided with a first cavity and an air inlet and an air outlet communicated with the first cavity; and a wind speed adjusting assembly, wherein the first cavity is provided with a plurality of wind speed adjusting assemblies distributed in a first direction, such that the first cavity is divided into a plurality of air outlet sections distributed in the first direction by the wind speed adjusting assembly; wherein each of the wind speed adjusting assemblies is configured to open or close at least some air outlets, so as to adjust outlet wind speed of each of the air outlet sections, the wind speed adjusting assembly comprises an adjusting member, and the air outlet of each of the air outlet sections comprises a first air outlet and a second air outlet, wherein a cross-sectional area of the first air outlet is different from a cross-sectional area of the second air outlet, and the adjusting member is configured to close the first air outlet, open the second air outlet, or close the second air outlet, open the first air outlet, the housing comprises an outer casing and an air guiding assembly, the air inlet is provided on the outer casing, the first air outlet is provided on the air guiding assembly, and the outer casing is further provided with a through hole, at least part of the air guiding assembly is located in the through hole, and the through hole has a first side wall and a second side wall provided opposite to each other in the second direction; and wherein the air guiding assembly has a third side wall and a fourth side wall provided opposite to each other in the second direction, and a gap between the first side wall and the third side wall and a gap between the second side wall and the fourth side wall form the second air outlet.

16. The air outlet apparatus according to claim 15, wherein a side wall of the outer casing is provided with a third air outlet, and the first air outlet is communicated with the third air outlet.

17. The air outlet apparatus according to claim 16, wherein the air guiding assembly has a second cavity, the first air outlet is communicated with the second cavity, and the side wall of the second cavity is provided opposite to the side wall of the air inlet, and both side walls are provided with the first air outlet; and wherein the third air outlet is communicated with the second cavity.

18. The air outlet apparatus according to claim 17, wherein in a direction away from the air inlet, the cross-sectional area of the second cavity gradually decreases.

19. The air outlet apparatus according to claim 15, wherein a sum of the cross-sectional area of the first air outlets is larger than a sum of the cross-sectional area of the second air outlets.

20. The air outlet apparatus according to claim 15, wherein the wind speed adjusting assembly further comprises partition plates provided opposite to each other in the first direction, and the partition plate is configured to separate the adjacent air outlet sections.

* * * * *